Feb. 10, 1970 P. B. SHUTT 3,494,131

MASTER CYLINDER CAP

Filed April 18, 1968

INVENTOR.
PAUL B. SHUTT
BY
Richard G. Geib
ATTORNEY

United States Patent Office 3,494,131
Patented Feb. 10, 1970

3,494,131
MASTER CYLINDER CAP
Paul B. Shutt, St. Joseph, Mich., assignor to The Bendix Corporation, a corporation of Delaware
Filed Apr. 18, 1968, Ser. No. 722,278
Int. Cl. F15b 7/08; B60t 11/10; B65d 51/16
U.S. Cl. 60—54.6                    4 Claims

ABSTRACT OF THE DISCLOSURE

A cap for a split master cylinder closing separate reservoir compartments of its housing such that pressure above atmospheric within one is first vented to the other and thereafter or if prevented therefrom to the exterior of the master cylinder.

Summary

Prior art devices such as disclosed by U.S. Patent No. 3,344,944 assigned to the common assignee of this patent and in which the inventor of this patent participated have provided solutions to the venting needs of sealed reservoirs for split master cylinders.

However, in such designs there is the possibility of fluid loss via the venting which this patent eliminates. In other words, this patent is directed to the improvement of the prior art venting approaches by arresting fluid loss because of venting of pressure above atmospheric in one reservoir compartment in contrast to the other with reference specifically to a split-system master cylinder for vehicle brakes of the present and future state of the art variety.

More particularly it is the object of this invention to provide, in addition to pressure responsive means venting separate sealed reservoir chambers in a housing to surrounding atmosphere, a connecting pressure responsive means between the separate chambers to vent them to each other prior to venting to surrounding atmosphere.

Drawing description

Other objects and advantages will appear to those skilled in the art from the following description with reference to the drawings wherein.

Detailed description

Figure 1:
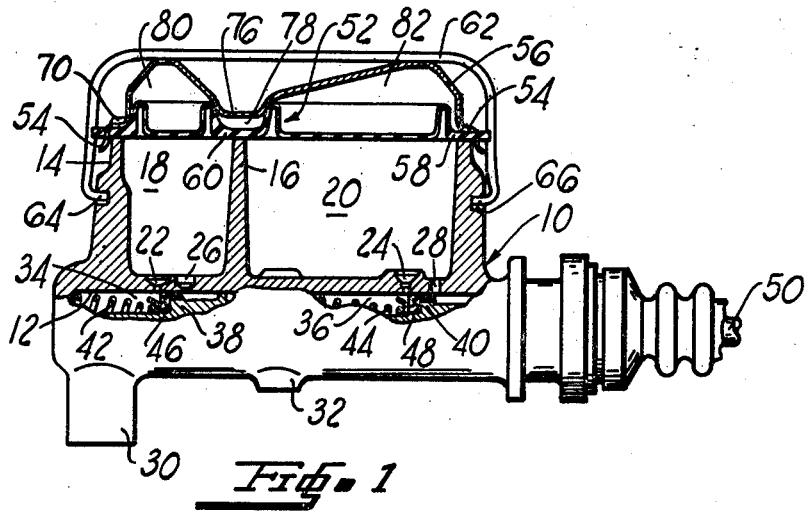
FIGURE 1 is a partial sectional view of a cap and master cylinder assembly.
Figure 2:
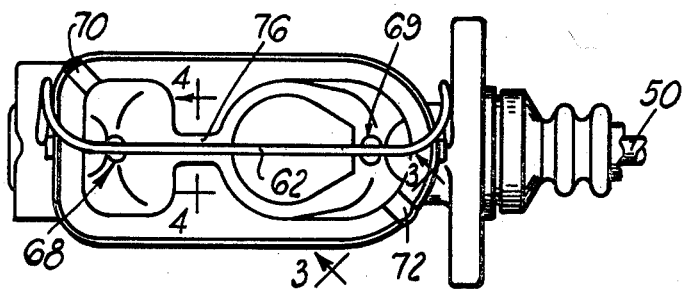
FIGURE 2 is a plan view of the assembly view of FIGURE 1.

Referring to FIGURES 1 and 2 there is shown a master cylinder casting 10 comprising a longitudinal bore 12 and a peripheral wall 14, which with inner wall 16 provides separate reservoir compartments or chambers 18 and 20. The chambers are open to the bore by spaced compensating ports 22 and 24 and spaced filler holes 26 and 28 in the housing casting 10. This casting is completed by spaced discharge ports 30 and 32 for the bore 12 which open into chambers 34 and 36 created in the bore by a secondary floating piston 38 and a primary piston 40 operatively related to the housing by a return spring 42 and to each other by a caged spring 44 to normally be located such that seal lips 46 and 48 are immediately behind (adjacent) compensating ports 22 and 24, respectively. A push rod 50 is connected to the primary piston 40 and to a brake pedal (not shown) to bring about the operator's control of the master cylinder.

The peripheral wall 14 of the casting 10 and the inner wall 16 have a machined top surface, as near as possible to a common line. The assembly of the master cylinder is completed then by joining a flexible diaphragm seal 52 to ears 54 on a cover 56. The diaphragm is rubber and has a thickened flange surface 58 for mating with the peripheral wall 14 and an intermediate strip 60, similarly thickened, for mating with the inner wall 16. The cover and diaphragm assembly, or cap as it may be termed, is pressure fitted to the casting 10 by a bail 62, which is pivotally attached by its ears 64 and 66 is recessed in the wall 14 to cross over the top of cover 56 into notches 68 and 69 to place the thickened flange and strip in compression on the top surface of walls 14 and 16.

Figures 3, 4:
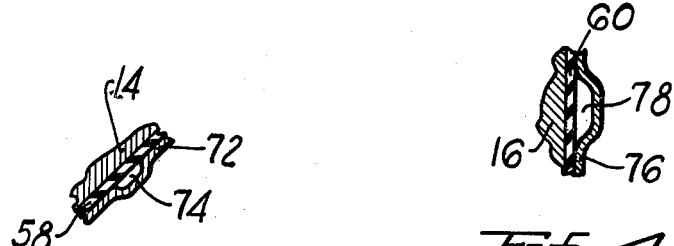
FIGURE 3 is a view taken along section lines 3—3 of FIGURE 2.
FIGURE 4 is a view taken along section lines 4—4 of FIGURE 2.

Before passing on to the operation of this assembly it should be pointed out that as shown in U.S. Patent No. 3,344,944, above-mentioned the cover 56 is provided with indentations 70 and 72 (see FIGURE 2) which, as seen in FIGURE 3, provide a space 74 of limited width above the flange 58 of the diaphragm. In addition to these, an indentation 76 is provided in the cover 56 across the strip 60 of the diaphragm to provide a space 78 (see FIGURES 1 and 4), which is of greater width than spaces 74, above the strip to communicate the spaces 80 and 82 in the cap 56 over the diaphragm portions in the separate reservoir chambers 18 and 20.

Operation

As the master cylinder is operated by depression of the brake pedal pistons 38 and 40 are moved to cause seal lips 46 and 48 to close the chambers 34 and 38. Thereafter, further movement of the pistons will transmit hydraulic pressure via discharge ports 30 and 32 to braking apparatus.

In the event fluid loss occurs, the respective system is replenished from reservoir chambers 18 and/or 20. In this instance the flexible portions of the diaphragm 52 will move because of atmospheric pressure thereover to a lower depth in chamber 18 and/or 20. If pressure due to thermal expansion builds up in one or both of these chambers, it will be effective on the flange 58 and strip 60 to bulge them into the areas of the spaces 74 and/or 78. However, as the strip 60 has a greater area of exposure to the pressure in chambers 18 and 20 and the atmospheric area thereabove than is true for the flange 58, it will bulge first to relieve pressure from one chamber to the other. Thus, fluid transfer is only between chambers and is not lost to the master cylinder. However, at greater pressure levels it may be exhausted overboard by bulging of flange 58 into space 74 of indentations 70 and/or 72.

Another salient feature of this invention is in the insurance that if one area of the cover, such as area 82 is at atmospheric pressure, then so is the other area 80 in the cover 56 by way of the channel or space 78. This maintains the relief action of the pressure responsive sections of flange 58 and strip 60 at the atmospheric pressures. Therefore, the brake system is not self-loaded as by thermal or other manner of fluid expansion.

Having fully described an operative construction of my invention, the scope of protection is now set forth in the appended claims.

I claim:

1. For a split master cylinder a cap in combination therewith closing separate reservoir compartments of a housing for the master cylinder formed by a peripheral wall of the housing and an inner wall, which cap has a generally flat surface for mating with said peripheral wall and said inner wall while maintaining a sealing member therebetween which combination is characterized by the improvement to said cap of three indentations in said cap two of which bridge said peripheral wall to permit flexure of said sealing member thereinto upon a predetermined pressure build-up in the respective compartment and the third of which communicate the separate reservoir compartments upon a certain pressure in one or the other developing of a lesser magnitude than said predetermined pressure whereby a limited pressure increase is permitted within one reservoir compartment without a loss of fluid via the respective indentation bridging the peripheral wall thereof to the exterior of the master cylinder.

2. The structure of claim 1 wherein the third indentation is a channel in said cap of greater width than said indentations across said peripheral wall such that sealing forces from the cap on the sealing member are interrupted by a greater span whereby lesser pressures under the sealing member will cause it to rise into said channel than with respect to the pressure differential required across the sealing member in the smaller indentations of the cap across the peripheral wall to raise the sealing member there.

3. A master cylinder construction comprising:
 a housing having a bore therewithin and a peripheral wall thereover divided by a partition to provide first and second reservoir chambers opened on each side of said partition to said bore, said wall and said partition terminating away from said bore in a flat surface;
 piston means in said bore to provide separate variable volume chambers in said bore opened by spaced discharge ports of said housing, said piston means being operable in said bore to develop separate pressures;
 a single cap for said first and second reservoir chambers, said cap being urged towards said flat surface by means connecting it to said housing, said cap having two spaced indentations forming spaced first and second channels between said first and second reservoir chambers and said exterior of said housing and a third indentation forming a third channel between said first and second reservoir chambers; and
 flexible sealing means between said cap and said flat surface, which sealing means is held on said flat surface by said cap such that any pressure differential below said flexible sealing means and above same in the areas of the first, second and third channels will first flex said sealing means to vent said first and second reservoir chambers to each other and when the pressure differential increases to the exterior of the housing whereby fluid losses are held to a minimum.

4. The structure of claim 3 wherein said third indentation provides a wider span for said third channel than said first and second channels whereby the pressure in the first and second reservoir chambers acts on a larger area of said flexible sealing means in said third channel than in said first and second channels.

References Cited

UNITED STATES PATENTS 3,344,944  10/1967  Shutt et al. _____ 220—44

MARTIN P. SCHWADRON, Primary Examiner

R. R. BUNEVICH, Assistant Examiner

U.S. Cl. X.R.

188—152; 220—44